(12) United States Patent
Harris (10) Patent No.: US 8,968,590 B2
(45) Date of Patent: Mar. 3, 2015

(54) COBALT CARBIDE-BASED NANOPARTICLE PERMANENT MAGNET MATERIALS

(75) Inventor: Vincent G. Harris, Sharon, MA (US)

(73) Assignee: Northeastern University, Boston, MA (US)

( * ) Notice: Subject to any disclaimer, the term of this patent is extended or adjusted under 35 U.S.C. 154(b) by 37 days.

(21) Appl. No.: 13/395,270

(22) PCT Filed: Sep. 10, 2010

(86) PCT No.: PCT/US2010/048477
§ 371 (c)(1),
(2), (4) Date: Mar. 9, 2012

(87) PCT Pub. No.: WO2011/032007
PCT Pub. Date: Mar. 17, 2011

(65) Prior Publication Data
US 2012/0168670 A1 Jul. 5, 2012

Related U.S. Application Data (60) Provisional application No. 61/241,207, filed on Sep. 10, 2009.

(51) Int. Cl.
| | | |
|---|---|---|
| B22F 9/14 | (2006.01) |
| B22F 9/16 | (2006.01) |
| B22F 1/02 | (2006.01) |
| B22F 9/24 | (2006.01) |
| C01B 31/30 | (2006.01) |

(Continued)

(52) U.S. Cl.
CPC .................. *B22F 9/24* (2013.01); *C01B 31/303* (2013.01); *C22C 32/0052* (2013.01);
(Continued)

(58) Field of Classification Search
USPC ................ 252/62.51 R, 62.55; 423/429, 440; 977/838
See application file for complete search history.

(56) References Cited

U.S. PATENT DOCUMENTS

| | | |
|---|---|---|
| 6,262,129 B1 | 7/2001 | Murray et al. |
| 6,517,934 B1 | 2/2003 | Kishimoto |

FOREIGN PATENT DOCUMENTS

| | | |
|---|---|---|
| JP | 19850268801 A | 6/1987 |
| JP | 19880252639 A | 4/1990 |

OTHER PUBLICATIONS

Wang et al, "Characterization and magnetic properties of carbon-coated cobalt nanocapsules synthesized by the chmical condensation process", Carbon, 41, 2003, pp. 1751-1758.*

(Continued)

*Primary Examiner* — Carol M Koslow
(74) *Attorney, Agent, or Firm* — McLane, Graf, Raulerson & Middleton, PA

(57) ABSTRACT

A composition of a crystalline ferromagnetic material based upon nanoscale cobalt carbide particles and to a method of manufacturing the ferromagnetic material of the invention via a polyol reaction are disclosed. The crystalline ferromagnetic cobalt carbide nanoparticles of the invention are useful for high performance permanent magnet applications. The processes according to the invention are extendable to other carbide phases, for example to Fe-, FeCo-carbides. Fe- and FeCo-carbides are realizable by using as precursor salts Fe-, Co-, and mixtures of Fe- and Co-salts, such as acetates, nitrates, chlorides, bromides, citrates, and sulfates, among others. The materials according to the invention include mixtures and/or admixtures of cobalt carbides, as both $Co_2C$ and $Co_3C$ phases. Mixtures may take the form of a collection of independent particles of $Co_2C$ and $Co_3C$ or as a collection of particles which consist of an intimate combination of $Co_2C$ and $Co_3C$ phases within individual particles. The relative proportions of these two phases as well as the morphology of each phase contribute to their attractive permanent magnet properties, particularly at low temperatures through room temperature and up to over 400 K.

23 Claims, 10 Drawing Sheets

(51) Int. Cl.
  *C22C 32/00* (2006.01)
  *H01F 1/06* (2006.01)
  *B22F 1/00* (2006.01)

(52) U.S. Cl.
  CPC .............. *H01F 1/065* (2013.01); *B22F 1/0018* (2013.01); *C01P 2004/10* (2013.01); *C22C 2202/02* (2013.01); *Y10S 977/838* (2013.01)
  USPC ................. 252/62.51 R; 252/62.55; 423/429; 423/440; 977/838

(56) References Cited

OTHER PUBLICATIONS

Babonneau et al., "Structural and Magnetic Properties of Fex-C1-x nanocomposite thin films," Journal of Applied Physics, 2000, vol. 87, pp. 3432-3443 (2000), p. 3432, col. 1, para 2; p. 3432, col. 2, para 2; p. 3433, col. 1, para 1; p. 3439, Figure 8B.

Nie et al., "Synthesis, Structure, and Magnetic Properties of Co nanocrystalline thin films and Annealing Effects," Journal of Applied Physics, 2003, vol. 93, pp. 4750-4755 (2003), p. 4750, col. 2, para 1-2; p. 4752, col. 1, para 1; p. 4753, col. 1, para 2-3; Figure 3; p. 4754, col. 1, para 3.

Yin et al, "In Situ Structural Evolution of Self-Assembled Oxide Nanocrystals," J. Phys. Chem. B 1997, 101, 8979-8983 (1997), entire document.

Huh et al. "Laser synthesis and magnetism of amorphous iron and cobalt carbide nanoparticles with carbon onion," Journal of Applied Physics, vol. 99, pp. 064302-1-064302-5 (2006).

\* cited by examiner

COBALT CARBIDE-BASED NANOPARTICLE PERMANENT MAGNET MATERIALS

CROSS-REFERENCE TO RELATED APPLICATIONS

This application is a national stage application under 35 U.S.C. §371 of international application PCT/US10/048,477, filed Sep. 10, 2010, and claims the benefit of U.S. Provisional Application No. 61/241,207, filed Sep. 10, 2009, the entire disclosures of which are hereby incorporated herein by reference.

STATEMENT REGARDING FEDERALLY SPONSORED RESEARCH OR DEVELOPMENT

This invention was made with federal government support under contract N000140910590 awarded by the Office of Naval Research. Therefore, the U.S. Government has certain rights in the invention.

BACKGROUND OF THE INVENTION

High performance permanent magnets, those having high energy products $(BH)_{max}$, where B is the magnetic induction and H is the coercive field, can be broadly classified into three categories: rare earth-3d transition metal intermetallics (e.g., $Nd_2Fe_{14}B$, $Sm_1Co_5$ and $Sm_2Co_{17}$), AlNiCo (alloys composed primarily of iron with additions of aluminum, nickel, cobalt, copper, and sometimes titanium), and ceramic magnets (typically strontium-doped barium hexaferrites). Commercial permanent magnet applications include those for exerting attractive and repelling forces (e.g., magnetic separators, latches, torque drives, and bearings), for energy conversion (e.g., magnetos, generators, alternators, eddy current brakes, motors, and actuators), for directing and shaping particle beams and electromagnetic waves (e.g., cathode ray tubes, traveling wave tubes, klystrons, cyclotrons, and ion pumps), and for providing magnetic bias fields for a wide range of rf, microwave, and mm-wave devices (e.g., isolators, circulators, phase shifters, and filters). The magnets containing rare earth elements provide the highest energy products, $(BH)_{max}$, but they are expensive and prone to corrosion, and pose severe cost limitations and supply chain challenges to commercial industries. Alternatively, AlNiCo and ceramic magnets have substantially lower $(BH)_{max}$ values but are significantly less expensive and more readily available from many sources. For that reason, AlNiCo and ceramic ferrite have captured substantial global permanent magnet market segments. The annual revenue generated by ceramic magnets is second only to that generated by high performance magnets of Nd—Fe—B.

However, very few additional developments in viable permanent magnet materials have occurred since the development of Nd—Fe—B in the early 1980s. Similarly, AlNiCo and ceramic magnets have not experienced significant improvement in permanent magnet properties for decades.

Improvements have come, though, to carbon-containing magnetic materials, which have many potential applications such as in high-density magnetic recording media, high resistivity soft magnetic materials, magnetic toner in xerography, and as contrast agents in high resolution magnetic resonance imaging. In previous work, researchers have focused on cobalt/carbide related materials that include carbon-coated magnetic-metal nanocrystallites (Wang et al., 2003), Co—C granular films (Lee et al., 2007; Konno et al., 1999; Wang et al., 2001), $M_nC$ (M=Fe, Co, Ni, Cu, n=1-6) nanoclusters (Black et al., 2004) and $Co_2C$ films (Premkumar et al., 20070. In those earlier works, the focus was placed on fabrication and application of carbon-related composites. The granular magnetic films, consisting of isolated particles suspended in a nonmagnetic host, were expected to produce low noise, high density magnetic media. The so-called core-shell nanoparticles constitute another form of nanocomposite. In the 1990s, McHenry et al. (McHenry et al., 1994) reported on the magnetic properties of carbon coated cobalt nanocrystallites. These nanocrystallites were proposed for applications ranging from recording media to emerging biomedical applications in imaging and cancer remediation therapies. Additional research has included theoretical and experimental studies of $M_nC$ (M=Fe, Ni, Co, etc.) clusters (Zhang et al., 2008), which are cage-like structures of transition metal containing carbon atoms that demonstrate unusual structural and chemical stabilities.

SUMMARY OF THE INVENTION

The present invention is directed to a composition of a crystalline ferromagnetic material based upon nanoscale cobalt carbide particles and to a method of manufacturing the ferromagnetic material of the invention via a polyol reaction. The crystalline ferromagnetic cobalt carbide nanoparticles of the invention provide a rare-earth-free alternative to NdFeB and SmCo for high performance permanent magnet applications. They compete directly with AlNiCo and ceramic based permanent magnets. In addition, the processes according to the invention are extendable to other carbide phases, for example to Fe-, FeCo-carbides. Fe- and FeCo-carbides are realizable by using as precursor salts Fe-, Co-, and mixtures of Fe- and Co-salts, such as acetates, nitrates, chlorides, bromides, citrates, and sulfates, among others. The materials according to the invention include mixtures and/or admixtures of cobalt carbides, as both $Co_2C$ and $Co_3C$ phases. Mixtures may take the form of a collection of independent particles of $Co_2C$ and $Co_3C$ or as a collection of particles which consist of an intimate combination of $Co_2C$ and $Co_3C$ phases within individual particles. The relative proportions of these two phases as well as the morphology of each phase contribute to their attractive permanent magnet properties, particularly at low temperatures through room temperature and up to over 400 K.

The cobalt carbide-based magnetic materials according to the invention are processed by chemical polyol reduction of metal salts. The precipitate of the reaction need only be rinsed and dried prior to packaging. Packaging may be in the form of isotropic or anisotropic high density compacts, bonded magnets, particle suspensions, etc. The best permanent magnet properties of the carbide particles according to the invention include room temperature coercivities as high as at least 4 kOe and room temperature saturation magnetization up to at least 70 emu/g. In the carbide particles according to the invention, the room temperature coercivity can be 500 Oe or greater, 1 kOe or greater, or 4 kOe or greater, and the room temperature saturation magnetization can be 20 emu/g or greater, 40 emu/g or greater, or 70 emu/g or greater. As increasing coercivity varies inversely with saturation magnetization, the appropriate balance of values of each of these properties for a specific application is optimized. The highest room temperature (BH)maxr the primary figure of merit for permanent magnets, is >20 $KJ/m^3$ for the free (i.e., not compacted) carbide powders according to the invention. (This comparison is made to other permanent magnetic free powders and not to compacted specimens.) In addition to permanent magnet applications that require high energy product, the invention allows for the synthesis of high magnetic moment, low coercivity particles that can find application as: high resistivity soft magnetic materials for power conversion, generation, and conditioning; magnetic toner in xerography; and as contrast agents in high resolution magnetic resonance imaging. Alternatively, cobalt carbide particles can also be synthesized that have high coercivity to provide them utility as high-density magnetic recording media.

The crystalline ferromagnetic cobalt carbide nanoparticles of the invention may be processed into permanent magnets using methods well known to those of ordinary skill. Permanent magnets are typically used as compacted cores. These are typically uniaxially pressed, followed by sintering at elevated temperatures for prolonged times. These compacts can be prepared as isotropic compacts or as anisotropic compacts, the latter with the field being applied during alignment. Anisotropic compacts are preferred for motor and power generation applications. Some particularly preferred applications for compacts of crystalline ferromagnetic cobalt carbide nanoparticles according to the invention include traveling wave tubes (TWT) for space exploration and satellite communication, inertial devices for accelerometers and gyroscopes, power tools for medical applications, permanent magnet motors and generators for aircraft engines, high density magnetic recording and video tapes, bio-labelling and drug carrier applications, hybrid car motors, and replacement materials for toner particles.

BRIEF DESCRIPTION OF THE SEVERAL VIEWS OF THE DRAWINGS

Other features and advantages of the invention will be apparent from the following description of the preferred embodiments thereof and from the claims, taken in conjunction with the accompanying drawings, in which:

FIGS. 2a-2c are high-resolution transmission electron microscopy images of a representative cobalt carbide nanoparticle sample according to the invention. The insert to FIG. 2a shows an agglomerated particle cluster about 300-500 nm in diameter. FIGS. 2a and 2b are TEM images of rod-like Co-carbide crystals surrounded by a thin 1 to 4 nm graphite-like layer (denoted by arrows). FIG. 2c is an HRTEM image of a rod-like Co-carbide nanoparticle of aspect ratio near 5:1;

FIGS. 3a-3c are HRTEM images of a $Co_3C$ nanoparticle with orientation close to the [010] zone axis. The FFT (Fast Fourier Transform) (FIG. 3b) was indexed to the $Co_3C$ phase (space group: Pnma with a=5.03 Å, b=6.73 Å and c=4.48 Å) with additional reflections appearing due to double diffraction. A simulated diffraction pattern of $Co_3C$ along this zone axis is provided for comparison in FIG. 3c. The corresponding IFFT (Inverse Fast Fourier Transform) image (FIG. 3d) shows the lattice spacing of about 5 Å, consistent with a [100] direction along the long axis of the particle;

FIG. 4a is an HRTEM image of a $Co_2C$ crystal (space group: Pnnm with a=4.45 Å, b=4.37 Å, and c=2.90 Å) close to the [001] zone axis. The FFT (inset to FIG. 4a with simulated diffraction pattern in FIG. 4b) from a portion of the crystal shows a near-square pattern indicative of this zone in which the lattice parameters a and b are nearly equal. The (100) and (010) reflections are present due to double diffraction. The IFFT image (FIG. 4c) indicates the lattice spacing of (100) and (010) is ~4.4 Å;

DETAILED DESCRIPTION OF THE INVENTION

The chemical synthesis methods employed herein to produce size-, shape-, composition- and phase-controlled, highly-coercive cobalt carbide nanoparticles according to the invention are based upon reduction of metallic salts in a liquid polyol medium that acts as both a solvent and a reducing agent. The reduction reaction kinetics of the process are enhanced by controlling the type, temperature, and concentration of the polyol medium and by adding appropriate surfactants that limit the re-oxidation of the reduced ions and regulate the growth of particles as the reaction progresses. The reaction takes place in the presence of a rare earth lanthanide series ion such as $Sm^{II}$ ions or another ionic form of a rare earth lanthanide series element as described herein.

In general, for the preferred embodiment crystalline $Co_xC$ nanoparticles according to the invention, the chemical synthesis method of the invention begins with the addition of a solution of a Co (II) salt (such as acetate, nitrate, chloride, bromide, citrate, and sulfate, among others) to tetraethylene glycol, with glycols of other molecular weights being equally feasible. Poly-vinylpyrrolidone (PVP, MW~40,000) is introduced as a capping agent along with NaOH as a catalyst, with other capping agents and catalysts being equally feasible. In an exemplary procedure, the reaction takes place in the presence of $Sm^{II}$. The $Sm^{II}$ ions are introduced as a nucleating agent, and they may also serve as an additional catalyst. The solution is allowed to degas in $N_2$ gas (or in some instances Ar gas) for 10-15 minutes prior to the start of the reaction. The solution is then heated to the boiling point of tetraethylene glycol (~573 K) for 1-2 h using a distillation apparatus with magnetic stirring although mechanical stirring is equally feasible. After the completion of the reaction, the solution is cooled to room temperature, magnetically separated several times using an external rare earth magnet (with other forms of separation such as centrifugation being equally feasible), and rinsed repeatedly in methanol to remove unreacted reagents. The precipitate is dried under vacuum at room temperature prior to characterization.

The dried powders were characterized by X-ray diffraction (XRD), transmission electron microscopy (TEM), and vibrating sample magnetometry (VSM) for the determination of phase, morphology, and temperature dependent magnetic properties, respectively. XRD measurements were performed using a Rigaku-Ultima-III Bragg-Brentano diffractometer employing Cu-Kα radiation (λ=0.15418 nm) in the θ-2θ powder diffraction geometry. Thermomagnetometry was performed using a Lakeshore Cryotonics Inc. Model 7400 VSM for temperatures ranging from room temperature to 1000 K. A Quantum Design physical property measurement system (PPMS) was employed to extend the temperature studies down to 10 K. The powders were characterized using a JEOL 2200-FX high-resolution transmission electron microscope with a 200 kV accelerating voltage. Samples for TEM were prepared by dispersing a drop of nanoparticle-loaded liquid suspension onto a carbon film supported by copper mesh (400 grid mesh) followed by evaporation of the liquid medium. Fast-Fourier transforms (FFTs) and inverse-fast Fourier transforms (IFFTs) were obtained from experimental high resolution TEM images using Digitalmicrograph™ software. Energy dispersive x-ray spectroscopy (EDXS) was utilized to determine the composition of the powder particles.

The following examples are presented to illustrate the advantages of the present invention and to assist one of ordinary skill in making and using the same. These examples are not intended in any way otherwise to limit the scope of the disclosure.

I. Structure, Phase and Morphology

For structural characterization, X-ray diffraction was used for phase identification and high resolution electron microscopy with selected area diffraction was used as a means, not only to confirm phase, but also to identify particle morphology, e.g., as spheroid or acicular particles.

Figure 1:
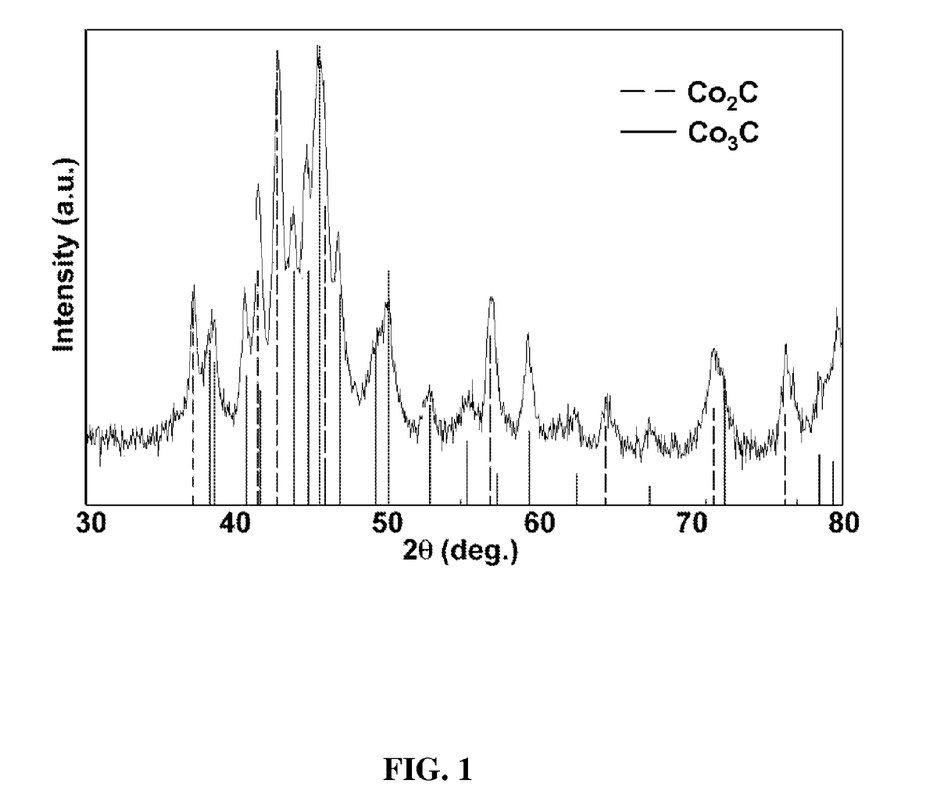
FIG. 1 shows a representative θ-2θ x-ray diffraction scan obtained from powder particles according to the invention processed using the polyol reduction reaction according to the invention. Vertical lines correspond to the position and amplitude of diffraction peaks from JCPDS reference powder diffraction files $Co_2C$ (65-1457) and $Co_3C$ (26-0450)

FIG. 1 shows a representative θ-2θ x-ray diffraction scan obtained from powders processed using the polyol reduction method according to the invention. In FIG. 1, the data collected at room temperature from powders that were chemically processed, rinsed, and dried, is depicted with an overlay of data from JCPDS reference powder diffraction files $Co_2C$ (65-1457) and $Co_3C$ (26-0450) in which the intensity and position of each Bragg diffraction peak is represented by a vertical line. (The JCPDS databases of diffraction files are universally used by materials scientists to identify phases and their relative content in unknown material systems.)

There exist some diffraction features, for example near 67 degrees in 2θ, whose amplitude arises from residual phases that may include different allotropes of carbon and/or unreacted precursors. XRD analysis confirms that $Co_2C$ and $Co_3C$ are the dominant phases present in these nanoparticles of the invention.

Figures 2A, 2C:
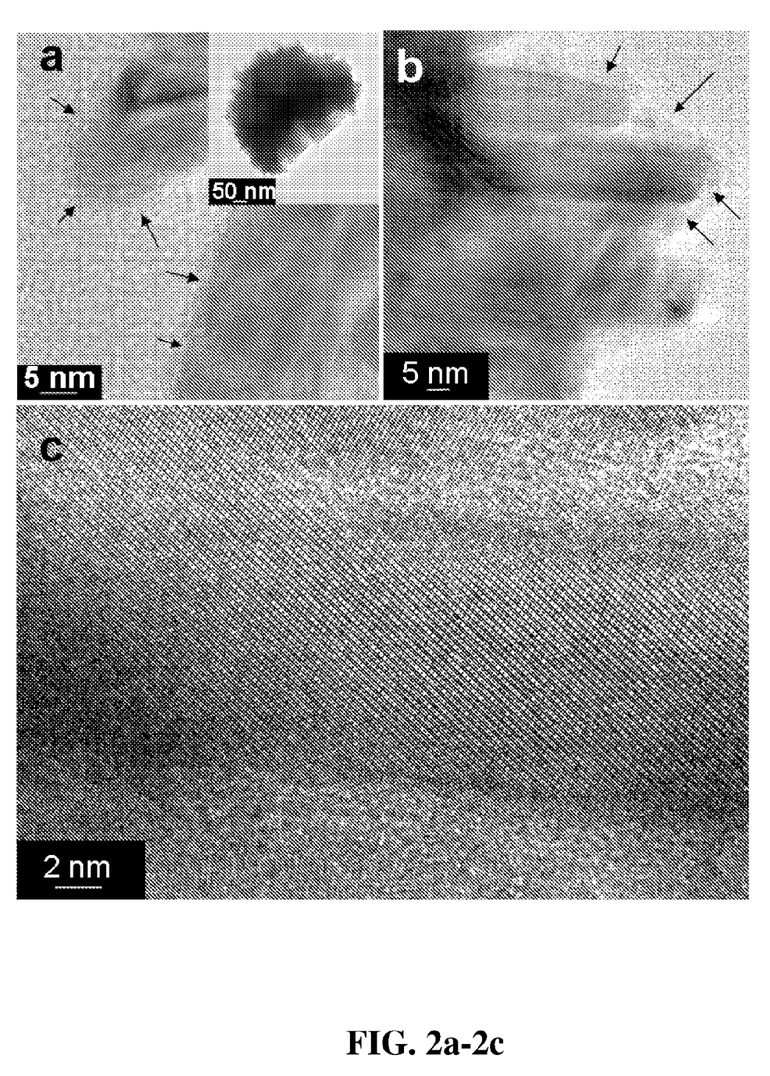

FIGS. 2a-2c depict high-resolution transmission electron microscopy images. TEM observations show agglomerated particle clusters, about 300-500 nm in diameter (see inset to FIG. 2a), consisting of nanocrystalline Co-carbide particles with acicular or rod-like morphology having an approximate 2:1 aspect ratio. The ferromagnetic nature of these particles is the driving force behind particle agglomeration. The acicular nature of the particles provides the potential for field-aligned particle compacts, i.e., anisotropic compacts, that will provide superior performance in power generation, conditioning, and conversion operations. FIGS. 2a and 2b are TEM images of rod-like Co-carbide crystals. These crystals are surrounded by a thin, 1 to 4 nm, graphite-like layer denoted by arrows in FIGS. 2a and 2b. Such a graphitic layer may form during synthesis from the reduction of precursors and surfactants and may act as a barrier that impedes crystal growth. FIG. 2c is an HRTEM (i.e., high resolution TEM) image of a rod-like Co-carbide nanoparticle with an aspect ratio near 5:1. In order to determine the crystal structure and preferred growth directions, fast Fourier transforms (FFT) were obtained from HRTEM images of individual nanocrystalline particles.

Figures 3A, 3D:
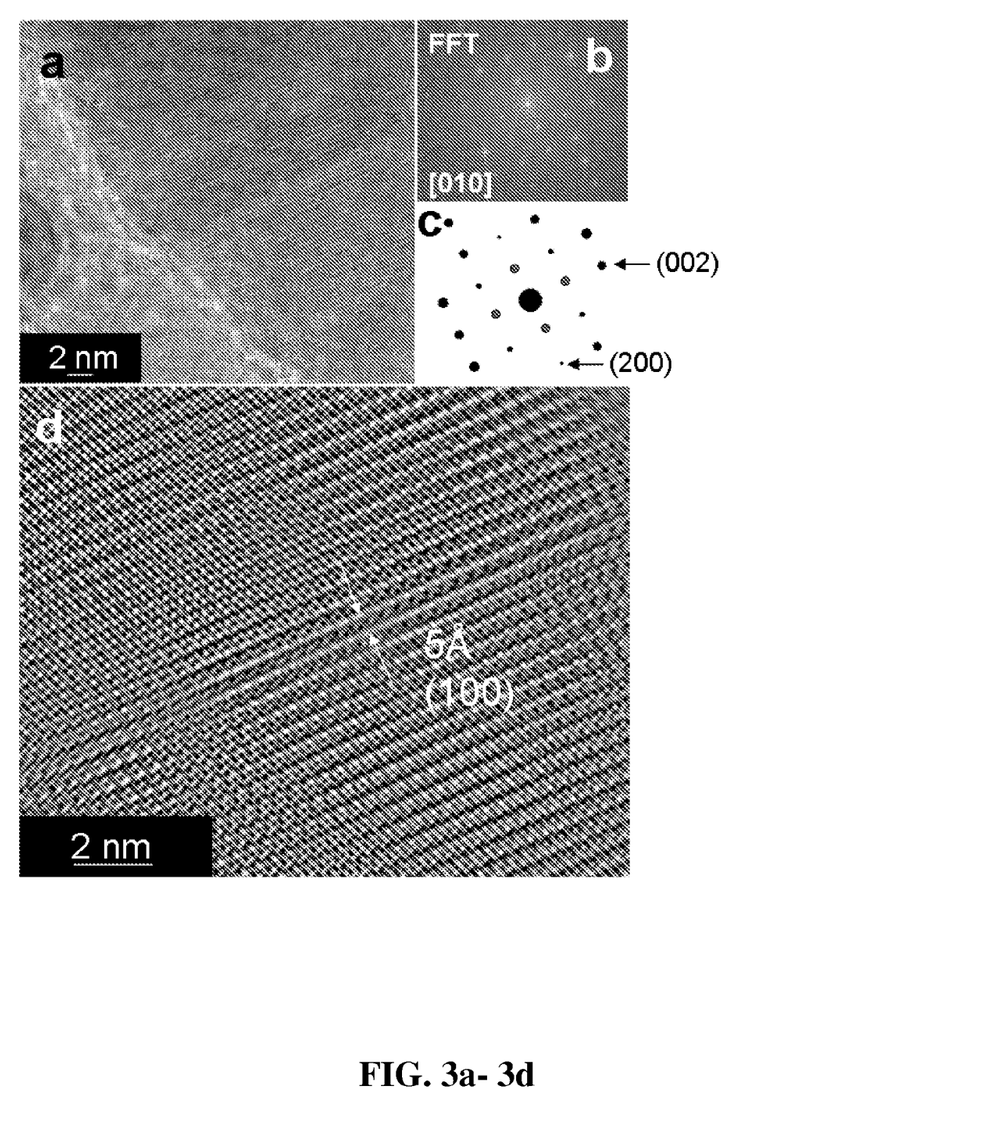

FIG. 3a is a HRTEM image of a $Co_3C$ nanoparticle with orientation close to the [010] zone axis. The FFT seen in FIG. 3b was obtained from part of the crystal and indexed to the $Co_3C$ phase (space group: Pnma with a=5.03 Å, b=6.73 Å and c=4.48 Å), with additional reflections appearing due to double diffraction. A simulated diffraction pattern of $Co_3C$ along this zone axis is provided for comparison (see FIG. 3c). The corresponding inverse fast Fourier transform (IFFT) image (FIG. 3d) shows the lattice spacing of about 5 Å, consistent with a [100] direction along the long axis of the particle.

Figures 4A, 4C:
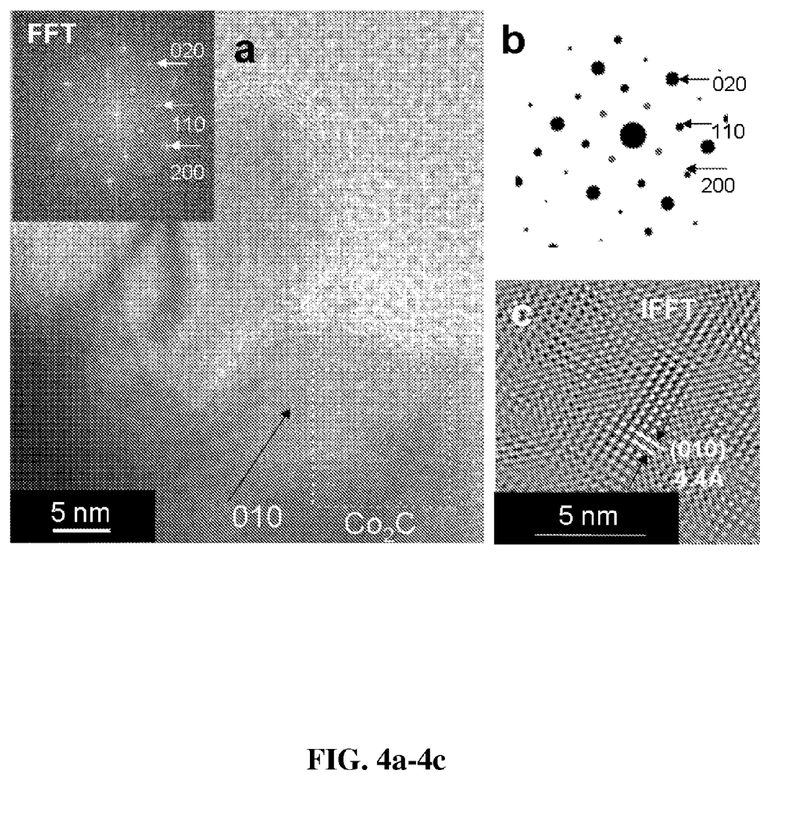

FIG. 4a shows a HRTEM image of a $Co_2C$ crystal (space group: Pnnm with a=4.45 Å, b=4.37 Å, and c=2.90 Å) close to the [001] zone axis. The FFT (FIG. 4b) from a portion of the crystal shows a near-square pattern indicative of this zone in which the lattice parameters a and b are nearly equal. In this zone, the (100) and (010) reflections are present due to double diffraction (FIG. 4b). The corresponding IFFT image (FIG. 4c) shows the lattice spacing of (100) and (010) is ~4.4 Å. Such HRTEM analyses confirm that the carbide nanoparticles of the invention have an acicular morphology, with the aspect ratio varying in relation to phase content and preparation conditions from 1.5:1 to 10:1 (and more frequently from 2:1 to 7:1), and that the crystallites are surrounded by a thin graphite-like layer.

Table I presents the phase volume ratios and lattice parameters of each phase determined by Rietveld reduction analyses of the XRD data for several samples. In addition to the these data derived from XRD analyses, similar data from selected area electron diffraction (SAED), as well as values reported in the literature from bulk standards are presented. The XRD and SAED determined lattice parameters are consistent with reported bulk values within the uncertainty of the measurements and analyses.

TABLE I

Structural properties of cobalt carbide nanoparticle samples according to the invention determined by X-ray diffraction and electron diffraction measurements.

| Sample No. | Volume Ratio $Co_2C:Co_3C$ | Lattice Parameters of $Co_2C$ (Angstrom) | | | Lattice Parameters of $Co_3C$ (Angstrom) | | |
|---|---|---|---|---|---|---|---|
| | | a | b | c | a | b | c |
| Bulk standards | | 4.371 | 4.446 | 2.897 | 4.444 | 4.993 | 6.707 |
| SAED | | 4.37 | 4.45 | 2.90 | 4.48 | 5.03 | 6.73 |

TABLE I-continued

Structural properties of cobalt carbide nanoparticle samples according to the invention determined by X-ray diffraction and electron diffraction measurements.

| Sample No. | Volume Ratio $Co_2C:Co_3C$ | Lattice Parameters of $Co_2C$ (Angstrom) | | | Lattice Parameters of $Co_3C$ (Angstrom) | | |
|---|---|---|---|---|---|---|---|
| | | a | b | c | a | b | c |
| 4-4 (2) | 1.89:1 | 4.361 | 4.446 | 2.888 | 4.448 | 5.005 | 6.718 |
| 4-4 (3) | 1.06:1 | 4.362 | 4.444 | 2.891 | 4.450 | 5.002 | 6.712 |
| 4-4 (4) | 0.93:1 | 4.365 | 4.443 | 2.894 | 4.454 | 4.998 | 6.714 |
| 4-4 (5) | 0.99:1 | 4.364 | 4.443 | 2.900 | 4.443 | 5.005 | 6.710 |
| 4-4 (8) | 1.46:1 | 4.361 | 4.444 | 2.890 | 4.454 | 5.004 | 6.707 |

II. Room Temperature Magnetic Properties

Figure 5:
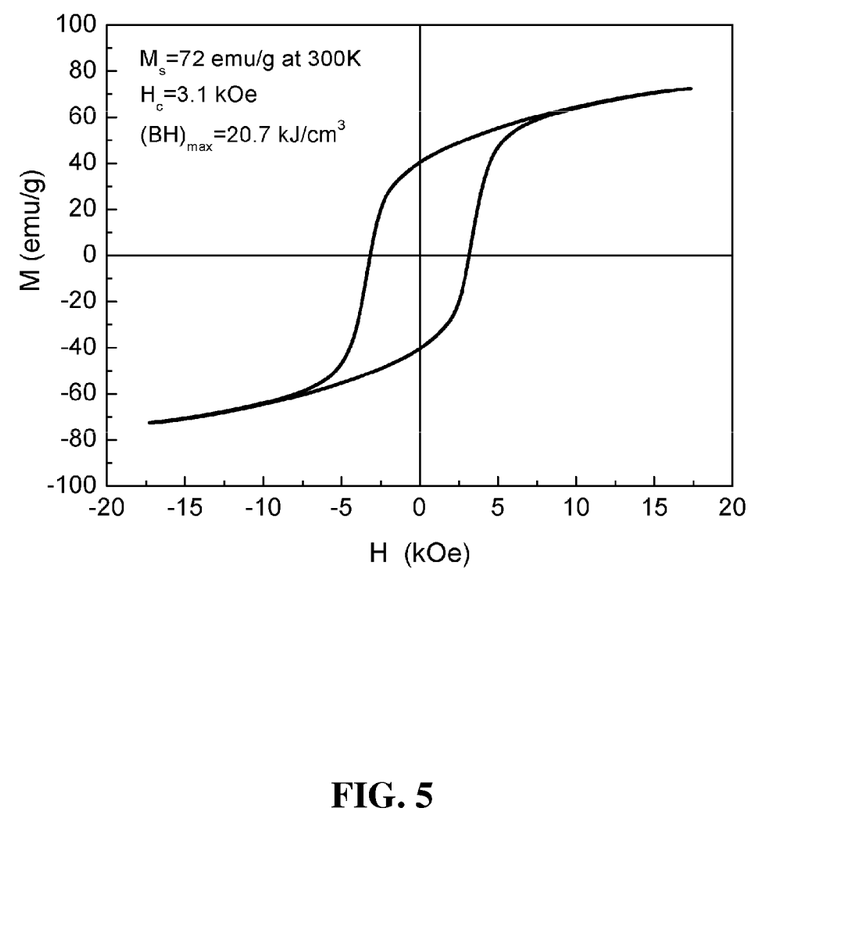
FIG. 5 shows a room temperature hysteresis loop of a representative nanoparticle powder sample according to the invention having Ms of 73 emu/g and an $H_c$ of 3.1 kOe. The $(BH)_{max}$ is 20.7 kJ/m$^3$.

FIG. 5 is a room temperature hysteresis loop curve of one cobalt carbide nanoparticle sample according to the invention. For this sample, the room temperature magnetization under an applied field of ~17 kOe is 73 emu/g with a coercivity of 3.1 kOe. The magnetization corresponding to an applied field of 17 kOe is reported as the saturation magnetization ($M_s$) although it is clear that saturation was not attained and, therefore, all energy product values are underestimated. This sample has a room temperature $(BH)_{max}$ of 20.7 KJ/m$^3$. All magnetization values have been corrected for the presence of the nonmagnetic graphitic surface layer. (The correction involved the calculation of the surface layer volume based upon the thickness measured in HRTEM images and assuming a rectangular cross section leading to the renormalization of the magnetic moment.)

Figure 6:
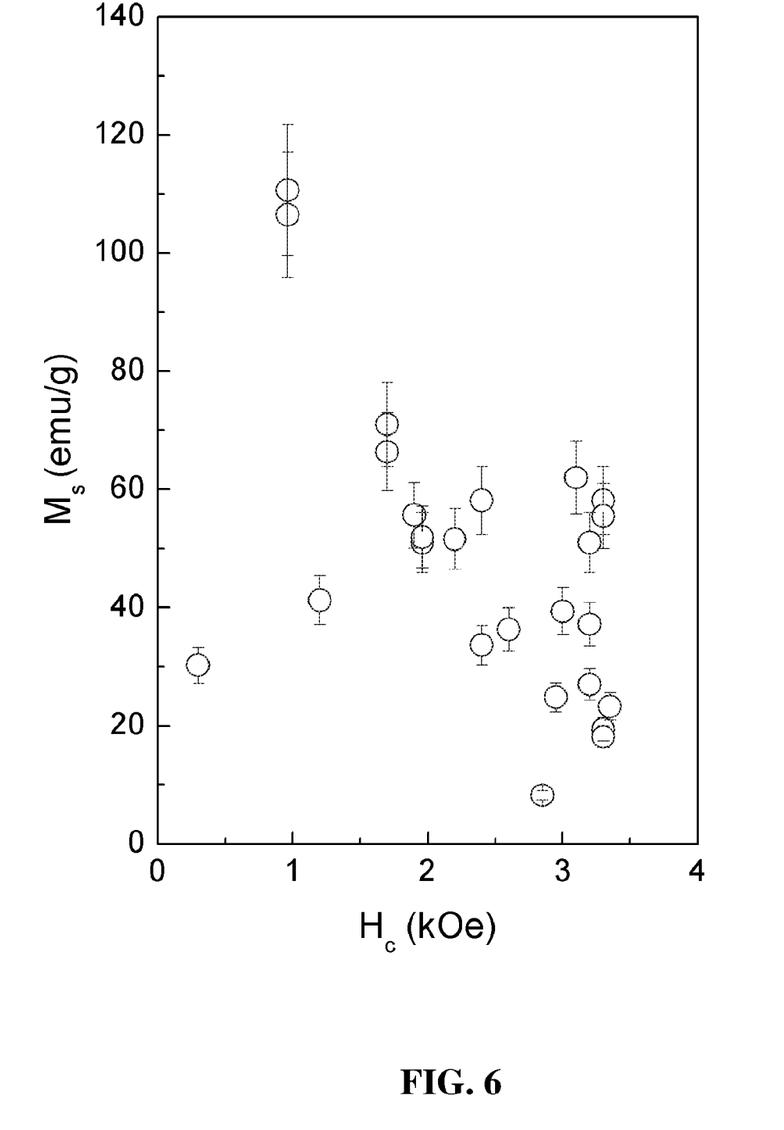
FIG. 6 shows room temperature saturation magnetization ($M_s$) data plotted versus coercive field ($H_c$) data for many nanoparticle powder samples according to the invention. Saturation magnetization values correspond to moments measured under the application of 17 kOe.

FIG. 6 presents the room temperature saturation magnetization and coercivity data for several $Co_xC$ particle samples collected during these experiments. It can be seen that there exists a great variation of property values coinciding with a broad range of chemical process parameters. Nonetheless, it is clear from FIG. 6 that there is a balance in magnetic properties—that is, the greater the saturation magnetization the lower the coercivity. These magnetic properties coincide with variations in the $Co_2C:Co_3C$ volume fraction and relative particle size and morphology of each phase. The error bars presented on FIG. 6 data points represent the uncertainty in the measurement of saturation magnetization due to the ambiguity in volume and mass of the particle sample. It would be clear to one of ordinary skill that variation of reactant and solvent molar concentrations, type and concentration of nucleating agent(s), type and concentration of surfactant agents, and other factors such as reaction temperature will lead to $Co_2C:Co_3C$ ratio control.

Figure 7:
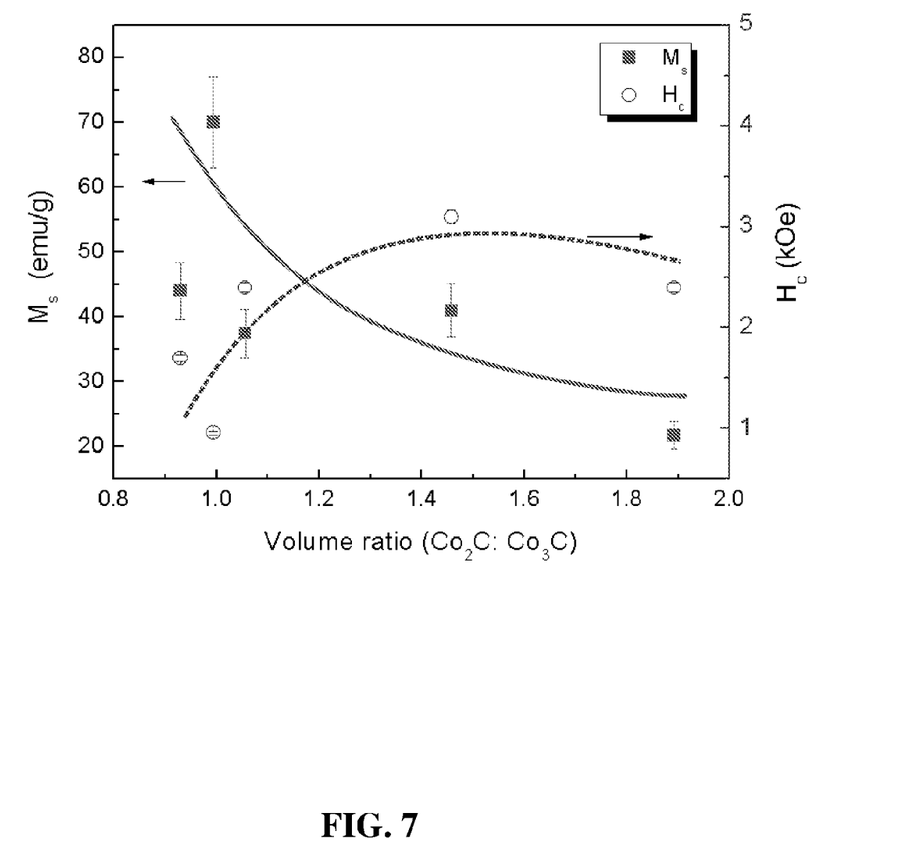
FIG. 7 shows the magnetic properties (saturation magnetization and coercivity) of a number of nanoparticle powder samples according to the invention plotted versus the phase volume ratio of the specific sample and illustrates the interrelationship among saturation magnetization, coercivity and the volume fraction of $Co_2C$ to $Co_3C$ as measured by X-ray diffraction. The plotted lines are intended as a guide to the eye. Error bars reflect the uncertainty in measured values.

FIG. 7 is a plot illustrating how the interrelationship between saturation magnetization and coercivity corresponds to the volume fraction of $Co_2C$ to $Co_3C$ as measured by x-ray diffraction (see Table I). It can be seen that, as the relative fraction of $Co_2C$ increases, e.g., from 0.8 to 2.0, the magnetization value of the sample is reduced while, concurrently, the coercivity value is increased. Error bars reflect the measurement uncertainty (the error bars on coercive field values being smaller than the symbols). These results suggest the role of each carbide phase. For example, the $Co_3C$ phase appears to be largely responsible for high saturation magnetization values of the samples while the $Co_2C$ phase is responsible for large coercivity values. These results do not, however, indicate the fundamental origin of the room temperature coercivity measured in these samples. Since the particles are clearly acicular in morphology, one can conclude that dipolar or shape anisotropy is responsible for some fraction of the large coercivity value. Further, the atomic structure in these phases deviates from cubic symmetry, and, therefore, a second source of anisotropy is expected to be of a magnetocrystalline nature. Other sources of coercivity may be related to exchange between particles. Such interparticle exchange, including that of $Co_2C$—$Co_2C$, $Co_2C$—$Co_3C$, and $Co_3C$—$Co_3C$, may provide yet other significant contributions to anisotropy, and subsequently coercivity, in these nanoparticle carbide systems.

III. Temperature Dependent Properties of Materials

Figure 8:
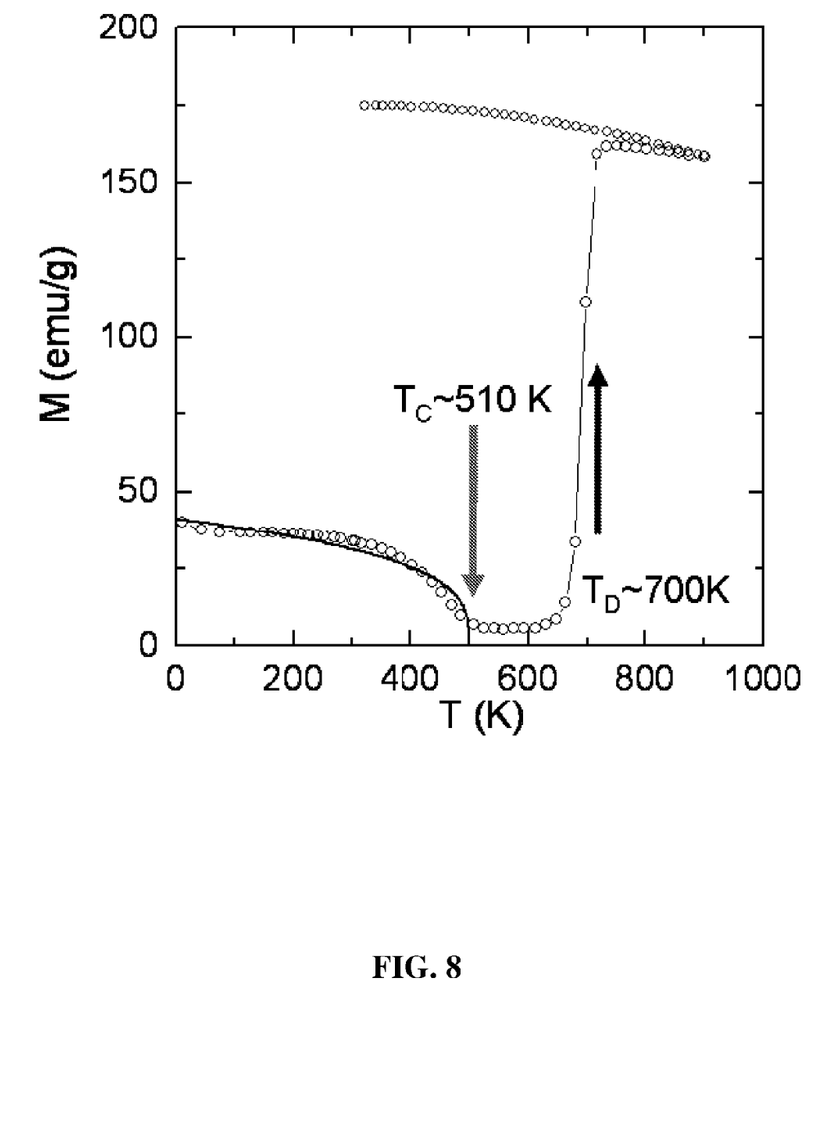
FIG. 8 shows the magnetization response to temperature for a representative sample according to the invention heated from 10 K to over 900 K. The magnetization value was determined under the application of a 10 kOe field. The solid curve is a fit to a molecular field theory approximation with $T_c$ of 510 K. At temperatures approaching 700 K, an irreversible transformation occurs. The high magnetization and Curie temperature of the sample heated above 700 K is consistent with metallic cobalt at that temperature.
Figure 9:
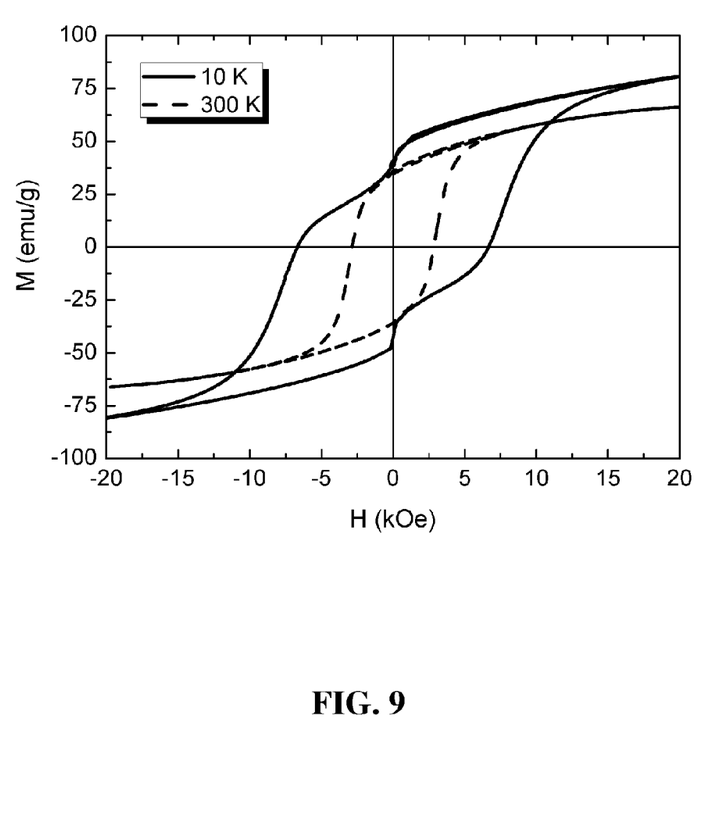
FIG. 9 shows the 300 K (RT) and the 10 K (low temperature) hysteresis loops of a representative nanoparticle powder samples according to the invention. At 10 K a knee is observed near remanence, indicating the decoupling of hard and soft phases. These results imply that the $Co_2C$ and $Co_3C$ phases are exchange coupled at room temperature but not at 10 K.

Thermomagnetic properties of a representative carbide powder sample are presented in FIGS. 8 and 9. FIG. 8 illustrates the temperature response of magnetization for a sample heated from 10 K to 900 K. Magnetization data were collected as a function of temperature under the application of 0.5 kOe and 10 kOe fields. The data of FIG. 8, collected under the application of a 10 kOe field, began at 10 K and approached a Curie temperature of ~510 K. The solid curve is a fit to a molecular field approximation. At temperatures approaching 700 K, a dramatic increase in magnetization is measured. The thermal cycle reveals an irreversible transformation. The magnetization and high Curie temperature of the sample heated above 700 K is consistent with metallic cobalt. It is possible that during this vacuum heat treatment the carbide disassociates to metallic cobalt and free carbon. Having a Curie temperature near 510 K, these materials may be useful for permanent magnet applications from room temperature to greater than 400 K.

As described above, it has been established that the exemplary cobalt carbide nanoparticles according to the invention exist in two phases, namely $Co_2C$ and $Co_3C$. The room temperature hysteresis loop of FIG. 5 illustrates a continuous variation of magnetization through remanence; behavior that is consistent with the exchange coupling of the two carbide phases. FIG. 9 contains both the 300 K and the 10 K hysteresis loops of a representative sample and clarifies this assertion. At 10 K, a knee is observed near remanence indicating the decoupling of hard and soft phases, presumably the $Co_2C$ and $Co_3C$ phases. From the trends seen in FIG. 7, the magnetically soft phase is likely $Co_3C$. These results imply that the $Co_2C$ and $Co_3C$ phases are exchange-coupled at room temperature. Whether the exchange is of a particle-particle nature, or as an intimate admixture of the two phases within a single particle, is as yet unknown.

It is also contemplated that cobalt carbide nanoparticles according to the invention, namely $Co_xC$, can be reduced to $Co_xC$+Co (metal) to create exchange coupled $Co_2C$/Co, $Co_3C$/Co, or ($Co_2C$+$Co_3C$)/Co nanoparticle systems. These nanoparticles would be of great value for high temperature operations and would be expected to have the same good range of coercivity and magnetization values as the $Co_2C$/$Co_3C$ nanoparticle systems described above. A person of ordinary skill could synthesize a mixture of cobalt carbide particles and metallic cobalt (iron or iron cobalt) particles by reduction chemistry, thermal decomposition (as demonstrated in FIG. 10), or by direct mixing of the particles, thus forming an exchanged coupled carbide-metallic heterostructure having superior high temperature performance owing to the high Curie temperature of the metallic cobalt (iron or iron cobalt). Such magnet systems would find utility in high temperature permanent magnet applications such as stator and rotor components in turbine power generator systems, among others.

Figure 10:
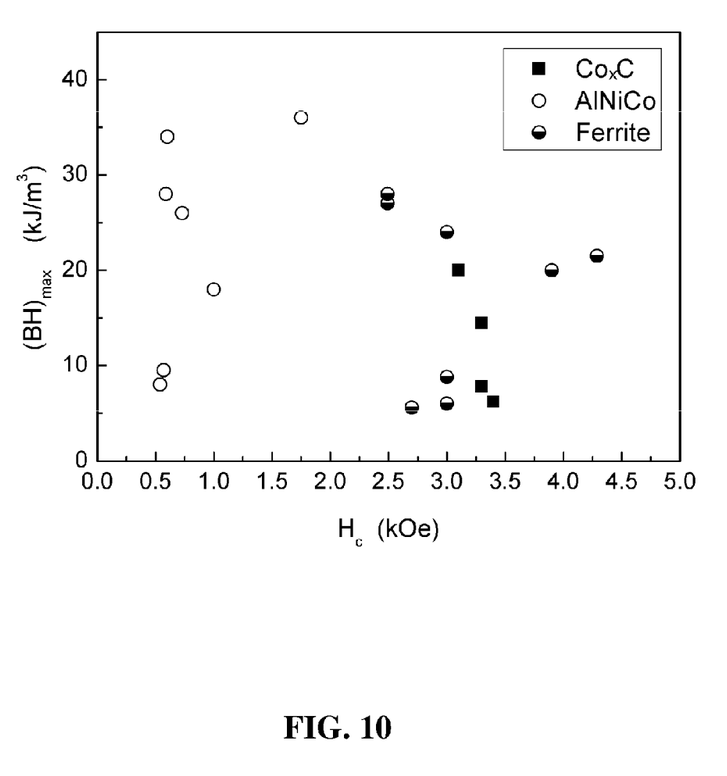
FIG. 10 shows energy products $(BH)_{max}$ as kJ/m$^3$, plotted versus intrinsic coercivity for cobalt carbide nanoparticle powders according to the invention compared with powders of AlNiCo and ceramic ferrite systems. Values of $(BH)_{max}$ of $Co_xC$ were calculated with corrected magnetization values as described.

FIG. 10 displays a comparison of $(BH)_{max}$ vs $H_c$ among $Co_xC$, AlNiCo and Ba/Sr ferrite ceramic magnets. AlNiCo is shown to exhibit high $(BH)_{max}$, 35 kJ/m$^3$, but a low intrinsic coercivity, mostly <1 kOe. Ba/Sr ferrite ceramic features high intrinsic coercivity, 3-4.5 kOe, but typical values of $(BH)_{max}$ below 25 kJ/m$^3$. However, the multiple-phase cobalt carbide nanoparticles of the invention demonstrate noticeable characteristics of permanent magnets, i.e., $H_c$~3.5 kOe and $(BH)_{max}$~20 kJ/m$^3$. This system has the potential to compete with both ferrite ceramic magnets and AlNiCo; the ferrite market segment in particular is second only to Nd—Fe—B. To date, the study of these cobalt carbide particles is limited to the results presented here. However, due to the existence of surface dead layers and nanomagnetic surface coatings, one would expect to see an increase in magnetization for larger $Co_xC$ particles. Therefore, it is expected that higher $(BH)_{max}$ values may be achieved in carbide permanent magnets with optimization of size, shape and volumetric ratio of the two phases, an optimization that is well within the skill of those of ordinary skill in the art.

REFERENCES

Black et al., 2004, *J Organometallic Chemistry* 689 2103-2113.
Konno et al., 1999, *J Magnetism and Magnetic Materials* 195 9-18.
Lee et al., 2007, *J Magnetism and Magnetic Materials* 310 913-915.
McHenry et al., 1994, *Phys. Rev. B* 49, 11358.
Premkumar et al., 2007, *Chem. Mater.* 19, 6206-6211.
Wang et al., 2001, *Materials Science and Engineering C* 16 147-151.
Wang et al., 2003, *Carbon* 41 1751-1758.
Zhang et al., 2008, *J. Molecular Structure: THEOCHEM* 863 22-27.
Zeng et al., 2007, *J Magnetism and Magnetic Materials* 309 160-168.

While the present invention has been described in conjunction with a preferred embodiment, one of ordinary skill, after reading the foregoing specification, will be able to effect various changes, substitutions of equivalents, and other alterations to the compositions and methods set forth herein. It is therefore intended that the protection granted by Letters Patent hereon be limited only by the definitions contained in the appended claims and equivalents thereof.

What is claimed is:

1. Crystalline ferromagnetic cobalt carbide nanoparticles comprising a mixture and/or admixture of cobalt carbides as $Co_2C$ and $Co_3C$ phases as the dominant phases of the nanoparticles, said nanoparticles having a coercivity value greater than or equal to 500 Oe at room temperature.

2. The nanoparticles of claim 1, said nanoparticles having a coercivity value greater than or equal to 1 kOe at room temperature.

3. The nanoparticles of claim 1, said nanoparticles having a coercivity value greater than or equal to 4 kOe at room temperature.

4. The nanoparticles of claim 1, wherein said nanoparticles have a magnetization value greater than or equal to 20 emu/g at room temperature.

5. The nanoparticles of claim 1, wherein said nanoparticles have a magnetization value greater than or equal to 40 emu/g at room temperature.

6. The nanoparticles of claim 1, wherein said nanoparticles have a magnetization value greater than or equal to 70 emu/g at room temperature.

7. The nanoparticles of claim 1, wherein said nanoparticles have an acicular morphology.

8. The nanoparticles of claim 7, wherein said nanoparticles have an acicular morphology with an aspect ratio between 1.5:1 and 10:1.

9. The nanoparticles of claim 1, wherein the volume ratio of the $Co_2C$ phase to the $Co_3C$ phase is in the range from 0.8 to 2.0.

10. The nanoparticles of claim 1 consisting essentially of cobalt carbides as $Co_2C$ and $Co_3C$ phases.

11. The nanoparticles of claim 1 further comprising metallic cobalt.

12. The nanoparticles of claim 11, said nanoparticles having a coercivity value greater than or equal to 1 kOe at room temperature.

13. The nanoparticles of claim 11, said nanoparticles having a coercivity value greater than or equal to 4 kOe at room temperature.

14. The nanoparticles of claim 11, wherein said nanoparticles have a magnetization value greater than or equal to 20 emu/g at room temperature.

15. The nanoparticles of claim 11, wherein said nanoparticles have a magnetization value greater than or equal to 40 emu/g at room temperature.

16. The nanoparticles of claim 11, wherein said nanoparticles have a magnetization value greater than or equal to 70 emu/g at room temperature.

17. The nanoparticles of claim 11 consisting essentially of cobalt carbides as $Co_2C$ and $Co_3C$ phases and metallic cobalt.

18. A compact for a high performance permanent magnet, said compact comprising the crystalline ferromagnetic cobalt carbide nanoparticles of claim 1.

19. The compact of claim 18 which is isotropic.

20. The compact of claim 18 which is anisotropic.

21. A method of making crystalline ferromagnetic nanoparticles, said nanoparticles comprising cobalt carbides as $Co_2C$ and $Co_3C$ phases, said nanoparticles having a coercivity value greater than or equal to 500 Oe, said method comprising the steps of:
chemically reducing one or more cobalt metal salts in a liquid polyol medium comprising one or more rare earth ions, whereby a reaction precipitate is formed, the precipitate comprising said nanoparticles;
collecting the reaction precipitate; and rinsing and drying the precipitate to yield said nanoparticles.

22. A method of making crystalline ferromagnetic iron carbide nanoparticles, said nanoparticles comprising iron carbides as $Fe_2C$ and $Fe_3C$ phases, said nanoparticles having a coercivity value greater than or equal to 500 Oe, said method comprising the steps of:
chemically reducing one or more iron salts in a liquid polyol medium comprising one or more rare earth ions whereby a reaction precipitate is formed, the precipitate comprising said nanoparticles;
collecting the reaction precipitate; and
rinsing and drying the precipitate to yield said nanoparticles.

23. A method of making crystalline ferromagnetic nanoparticles, said nanoparticles comprising a multiphase mixture and/or admixture of iron cobalt carbides, said nanoparticles having a coercivity value greater than or equal to 500 Oe, said method comprising the steps of:
chemically reducing one or more iron and cobalt salts in a liquid polyol medium comprising one or more rare earth ions whereby a reaction precipitate is formed the precipitate comprising said nanoparticles;
collecting the reaction precipitate; and rinsing and drying the precipitate to yield said nanoparticles.

* * * * *